Patented Sept. 10, 1940

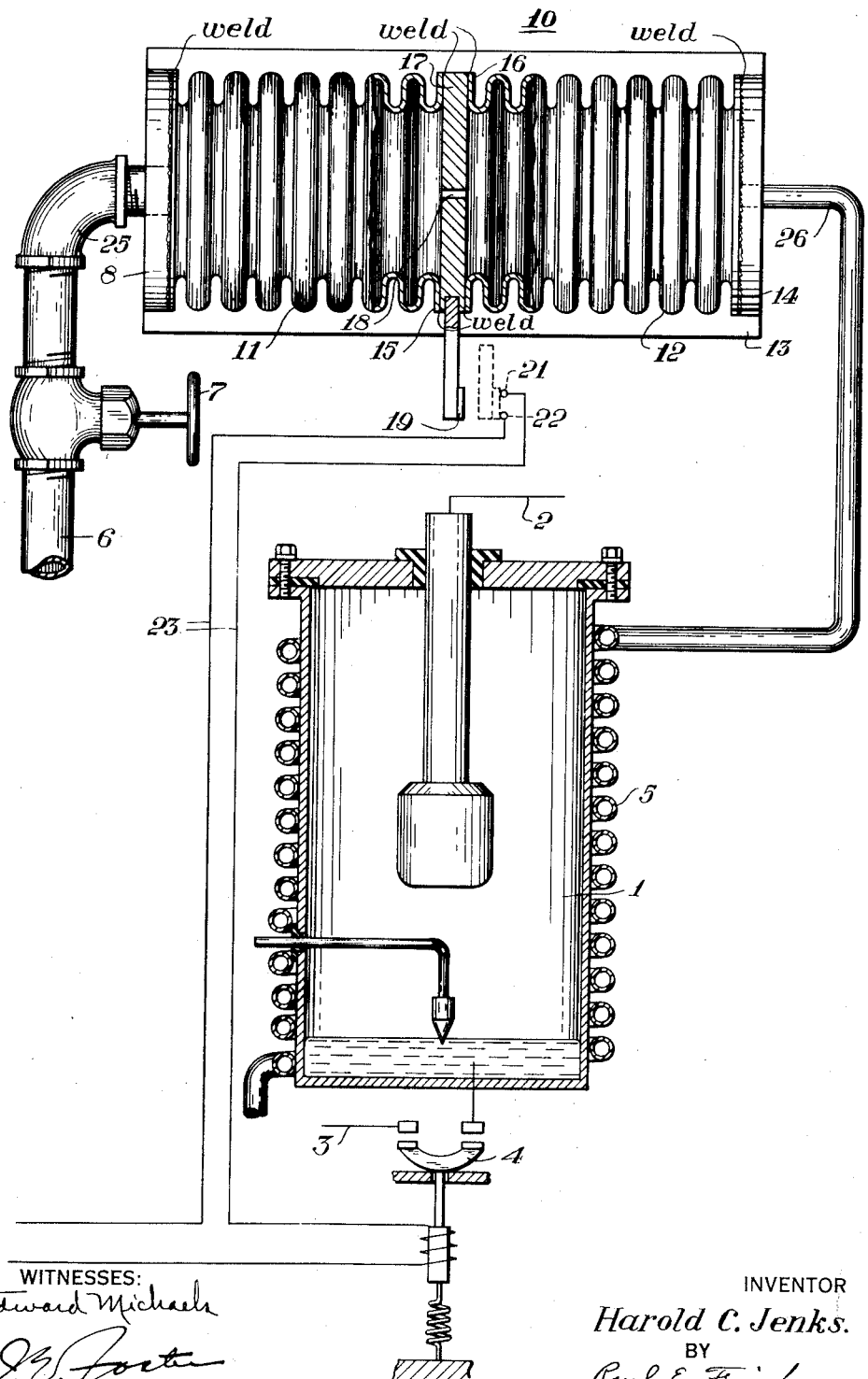

2,214,616

UNITED STATES PATENT OFFICE 2,214,616

PRESSURE AND FLOW RELAY

Harold C. Jenks, Wilkinsburg, Pa., assignor to Westinghouse Electric & Manufacturing Company, East Pittsburgh, Pa., a corporation of Pennsylvania Application March 4, 1939, Serial No. 259,927

4 Claims. (Cl. 250—27.5)

This invention relates to protective devices, and particularly to a combination pressure and flow relay for supervising the flow of cooling water to a water cooled energy translating device such as a high power rectifying device.

In the operation of rectifiers, such as Ignitrons, for power purposes where relatively large currents are rectified as for welding purposes, the rectifiers are water cooled to enable them to operate continuously at such high loads without damage. In order that their useful life may be maintained it is essential that they be kept cool, and it is therefore important that the flow of cooling water be supervised to assure a continuous flow of cooling water, or to interrupt the operation of the rectifiers in case anything happens to prevent the normal flow of water that will establish proper cooling action.

The element of cost is always an important one, and for such an application, no flow meters of satisfactory performance having a reasonably low cost have been available. In the past it has therefore been the practice to resort to pressure relays. In such systems of the prior art, the cooling water was supplied to an inlet pipe to which a pressure relay was connected. The pressure relay was provided with electrical contacts which were to be maintained closed under normal conditions to provide desired protective control of the apparatus and equipment.

Such prior systems have not been entirely satisfactory, however, since discharging the cooling water into a high pressure outlet, such as might be found in a recirculating cooling circuit, would build up the pressure throughout the entire cooling system sufficiently to maintain the relay contacts closed even though the cooling water had ceased flowing. Similarly, a stoppage in the discharge pipe with consequent cessation of fluid-flow would similarly build up the back pressure and maintain the relay closed as under normal conditions.

Such prior systems have therefore been unsatisfactory since they were unable to distinguish between pressures developed during normal contions and pressures developed during abnormal conditions.

The object of my invention, therefore, is to provide a relay that shall be responsive to the pressure and to the fluid-flow in such manner as to distinguish between the pressures caused by normal flow conditions and those pressures which might be caused by abnormal flow conditions, or cessation of flow, and thereby to determine whether to permit the protected apparatus to continue operating or to disconnect it from service.

In the application of my invention to an operating structure, I provide two Sylphon bellows connected in the circuit to conduct the cooling fluid. The bellows are preferably initially compressed and disposed in normal counteracting and counterbalancing relation with their outer ends braced, on a support, against stationary walls that are maintained at a fixed spacing. An inlet tube is connected through one of the walls to one bellows, and an outlet tube is connected through the other wall to the other bellows. The inner ends of the two bellows are secured together against an orifice plate, which serves as a partition between the two bellows except for the orifice in the plate which communicates with the two bellows and transmits the cooling water for the system.

This orifice plate, to which the inner ends of the bellows are fixed, is floatingly supported and free to move in space in response to the self-adjusting movements of the bellows, according to the reaction forces set up by the pressures on both sides of the orifice plate. Normally, the bellows will be counterbalanced, and the orifice plate will be held in a position where it will open a contact switch that serves to control an external circuit to the protective equipment associated with the welding apparatus. During normal operation of the water cooling system, the pressure drop through the orifice will be sufficient to enable the inlet bellows to overcome the back pressure at the outlet bellows, and, thereby, to close the contact switch to maintain the external protective circuit closed. So long as that normal condition exists, the apparatus and equipment will be permitted to function. If anything should happen in the water cooling system to prevent the normal flow of water, the pressure on the outlet side of the relay will increase and counteract and counterbalance or overbalance the pressure drop through the orifice plate, as a result of which the two bellows will become balanced or reversely unbalanced and will open the contact switch to the external protective circuit.

The manner in which the relay operates, and the details of its construction, are illustrated in the accompanying diagram and schematic view of the system, in which a heavy duty rectifier 1, which may be employed for heavy duty industrial applications such as welding, is shown receiving energy, from an alternating current supply circuit 2, which it rectifies and supplies to a utilization or load circuit 3 through a circuit breaker 4. For the sake of simplicity all of the usual control and protective equipment for the rectifier itself is not illustrated, since that equipment is unnecessary to illustrate the present invention.

The rectifier device 1 is provided with a cooling system which may be illustrated in simple fashion as a coiled water tube 5 encircling the rectifier tank in such manner as to establish efficient heat transfer. The water to the cooling system 5 is received from a suitable water main 6 through a manually operable valve 7, and is transmitted to the cooling coil 5 through the combination pressure and flow relay 10 that embodies the principles and features of my invention.

The relay 10 comprises, generally, an inlet bellows 11 and an outlet bellows 12 both suitably supported in a frame with the outer end of the inlet bellows 11 fixed to and sealed against a wall 8 of a stationary supporting frame 13, and with the outer end of the bellows 12 fixed to and sealed against a fixed wall 14 on the supporting frame. The inner ends 15 and 16 of the respective bellows 11 and 12 are secured to and sealed against opposite sides of a floating orifice plate 17 provided with a thin-walled orifice 18 communicating with the chambers of both bellows. The floating orifice plate 17 supports and carries a contact member 19 which serves to bridge two contact members 21 and 22 to control an external protective circuit 23.

The cooling water passes through the relay 10 through an inlet conduit 25 that is connected with the chamber of the inlet bellows 11 through the wall 8 and passes out of the relay through an outlet conduit 26 that communicates with the chamber of the outlet bellows 12 through an opening in the outer wall 14.

The two outer walls 8 and 14 are fixed in their spaced relationship so that the outer ends of the bellows are not free to move. The inner ends of the bellows, however, are free to move the self-adjusting floating orifice disk 17 according to the differential reaction pressures established in the cooling circuit on opposite sides of the orifice.

When the cooling circuit is to be operated, the manual control valve 7 is opened, and the cooling water is permitted to flow through the system and out to a suitable drain or to a recirculating system after it passes through the cooling coil 5 surrounds the tank of the rectifier 1.

When the water flows into the inlet chamber in the bellows 11, it builds up pressure in the bellows and expands bellows 11 against the reaction pressure of the bellows 12, and closes the circuit between the switch contacts 21 and 22 by the bridging contact 19. The orifice 18 is calibrated to transmit sufficient water to cool the rectifier tank and to establish a pressure drop sufficient to move the orifice plate to close the switch contacts. So long as that quantity of water continues to flow, the pressure drop across the orifice 18 will be sufficient to establish a pressure differential between the two bellows 11 and 12, respectively, to force the floating orifice plate 17 to a position to close the switch contacts 19, 21 and 22.

While water flow conditions are normal and the switch 19 is closed, the protective circuit 23 will be energized to maintain the circuit breaker 4 in closed position.

This protective circuit is illustrated in its simplest and fundamental showing, since it is obvious that according to the nature of control desired, other relays may be interposed, or the type of circuit breaker employed may be different from that shown here.

If anything should happen in the water cooling system, that would restrict or prevent the flow of fluid according to the calibration of the orifice 18, sufficient back pressure would be established on the outlet sides, or the pressure drop through the orifice would be sufficiently diminished, to enable the outlet bellows 12 to balance, or to overbalance the bellows 11. The less energized floating orifice plate 17 would then be moved backward to an extent that would open the switch contacts controlled by the orifice plate, and the protective holding circuit 23 to the main circuit breaker 4 would be opened and would disconnect the rectifier from the load circuit.

My invention is illustrated to show the principle that is involved rather than absolute details of construction, and it will therefore be obvious that the structural details may be redesigned and rearranged without departing form the spirit and scope of the invention as set forth in the appended claims.

I claim as my invention:

1. In a cooling water system for a high energy output space discharge device in combination, an energy supply circuit for said device, a switch for said circuit, a water supply conduit and a cooling coil for said device, of means responsive to the flow of water to the cooling coil for permitting the continued operation of the device during normal flow of cooling water at a predetermined rate by maintaining said switch closed, and for preventing further operation of the device when the fluid flow is below normal by opening said switch, said means including an orifice plate in the path of the cooling water and provided with an orifice for conducting the cooling water, and a bellows-type expansible conduit connected on each side of the orifice plate to floatingly support the plate and connected in series with the supply conduit and the cooling coil whereby the cooling water passes through the bellows-type expansible conduit and the orifice of the orifice plate to move the plate with below-normal water flow, and means controlled by the floating plate to operate said switch in said supply circuit.

2. A cooling water system for an electric discharge device, comprising, an electric discharge device, an external circuit for said device, a conduit system for the cooling water, an orifice plate having an orifice of predetermined size to develop a predetermined pressure drop when normal flow of cooling water passes through the orifice, means supporting the orifice plate for self-adjusting movement in response to the pressure drop across the orifice, said means consisting of two normally counterbalanced initially stressed bellows connected in the conduit system to conduct the cooling water and to guide the water through the orifice of the plate, and means responsive to a predetermined movement of the plate for controlling said external circuit according to the plate position to control the discharge device.

3. In a protective system for a relatively high energy output space discharge device, in combination, a space discharge device, a cooling coil therefor, a source of supply of electric energy for the discharge device, switching means for connecting and disconnecting the discharge device and the source of supply, a water, or other cooling liquid, supply conduit for supplying the cooling coil with a flow of liquid, a Sylphon bellows connected directly in series with the cooling liquid supply conduit so that liquid flows through the bellows, a member provided with a liquid flow restricting orifice disposed transversely of the bellows in spaced relation to the ends of the bellows and connected to the bellows so that liquid flowing through the bellows flows through the liquid flow restricting orifice whereby the member is adapted to move as a function of the liquid flow in the conduit, and means coupled to the member adapted to operate said switching means.

4. In a protective system for a relatively high energy output space discharge device, in combination, a space discharge device, a cooling coil therefor, a source of supply of electric energy for the discharge device, switching means for connecting and disconnecting the discharge device and the source of supply, a conduit for supplying a cooling medium to the cooling coil, a Sylphon bellows connected in series relation with the conduit and the cooling coil so that liquid flowing through the cooling coil also flows through the bellows, cooling medium flow restricting means in the bellows disposed transversely of the bellows and intermediate the ends thereof whereby abnormal variations in flow of liquid through the flow restricting means causes the flow restricting means to move an abnormal amount as a function of the flow of the cooling medium, and means responsive to the abnormal amount of movement of the flow restricting means for operating said switching means.

HAROLD C. JENKS.